June 13, 1967 K. W. BROLING 3,324,807
UNIVERSAL TIE DOWN WINCH
Filed Aug. 27, 1965 2 Sheets-Sheet 2
Fig.4
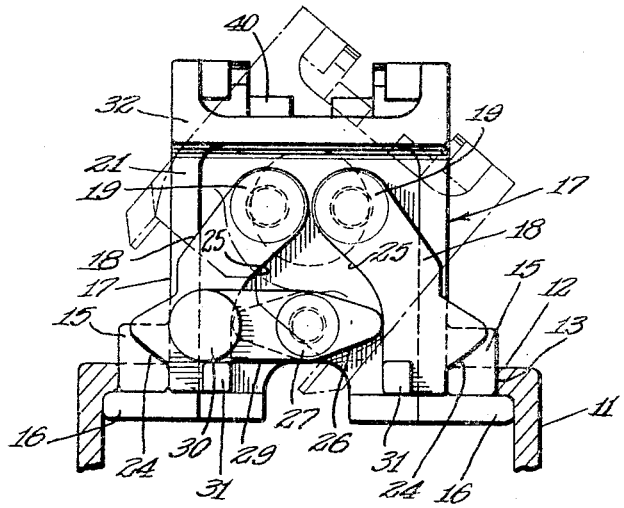
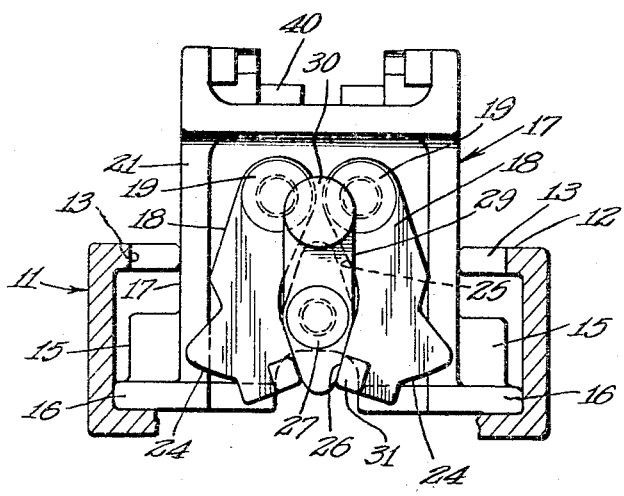
Fig.2
INVENTOR.
Keith W. Broling
BY Hill, Sherman, Meroni, Gross & Simpson ATTORNEYS

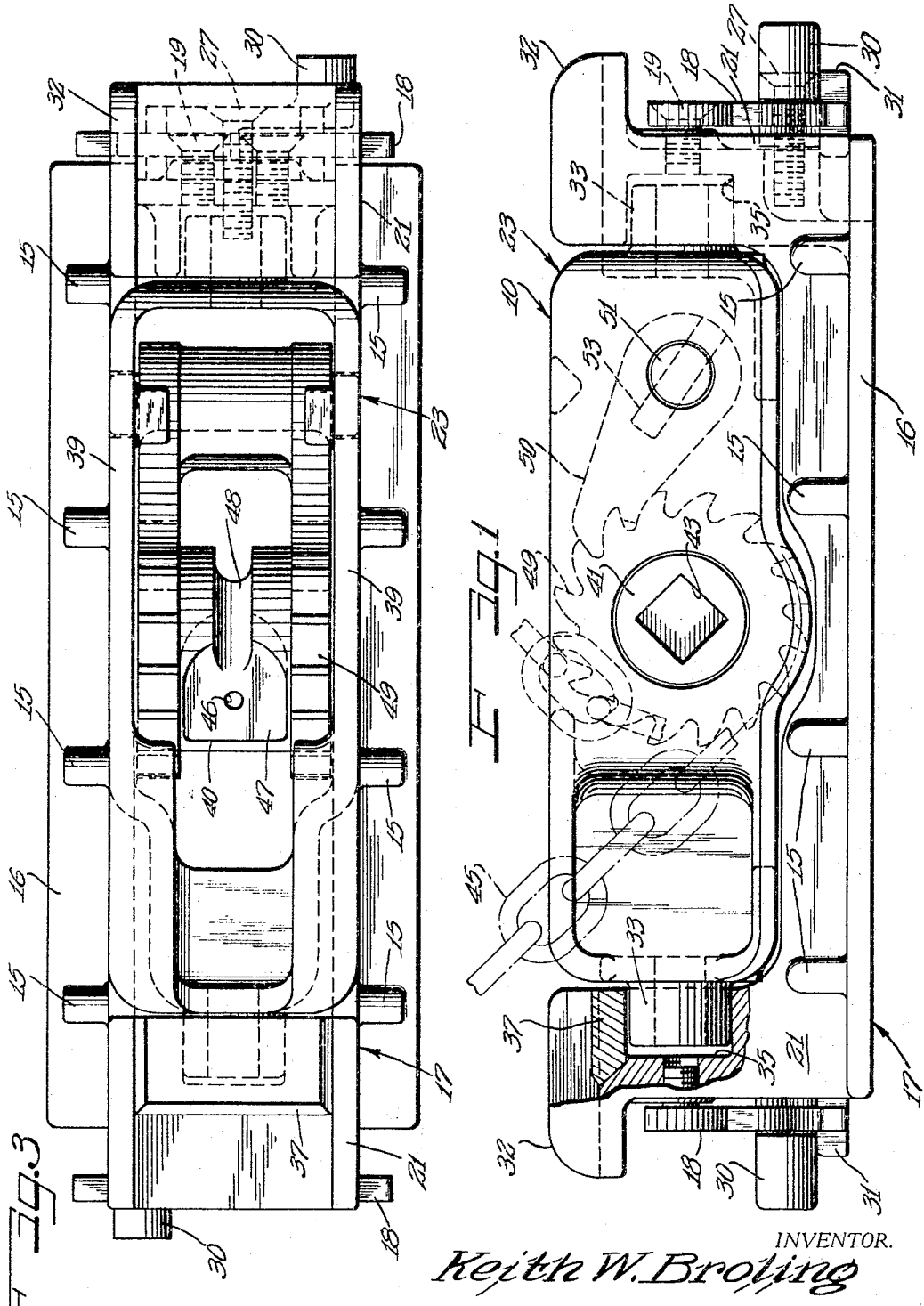

United States Patent Office 3,324,807
Patented June 13, 1967

3,324,807
UNIVERSAL TIE DOWN WINCH
Keith W. Broling, Homewood, Ill., assignor to Brandon Equipment Company, Inc., Chicago, Ill., a corporation of Illinois
Filed Aug. 27, 1965, Ser. No. 483,286
7 Claims. (Cl. 105—369)

The present invention relates to improvements in an apparatus for securing vehicles, such as tractors, trucks and the like, in place on railroad cars for transportation.

A principal object of the present invention is to provide a simple and improved form of tie down winch for securing vehicles, such as trucks, tractors and the like, in place on railroad cars and the like for transportation, which is characterized by a high degree of flexibility, enabling the operator to attach a flexible tie down connector to a vehicle at various angular positions with respect to the tie down apparatus and attain the proper tension on the flexible tie down connector to securely hold the vehicle in place on the car.

Another object of the invention is to provide a new and heavy duty vehicle tie down winch, especially suitable for use in transportation of vehicles on railroad flat cars and the like, and so arranged as to facilitate the securing of the truck in place on the railroad car.

Still another object of the invention is to provide a new and improved form of universal tie down winch having an improved mounting for the winch, enabling the winch to conform to the angle of the flexible tie down connector, and enabling the flexible connector to be trained angularly forwardly or rearwardly of the drum for the winch.

A still further object of the invention is to provide in a vehicle tie down apparatus, a new and improved winch, in which the take-up drum for the winch is freely pivoted for adjustable movement about an axis extending perpendicularly to the axis of rotation of the drums, to accommodate the axis of rotation of the take-up drum to be maintained in a plane perpendicular to the flexible connector wound thereon, to thereby conform the drum to the load thereon and improve the tie down efficiency of the winch, and also to enable the flexible connector trained from the winch to be trained forwardly or rearwardly of its take-up drum.

Still another object of the invention is to provide a novel, quick releasable but positive holding supporting latch means for maintaining a tie down winch in adjusted position along a retainer channel.

These and other objects of the invention will appear from time to time as the following specification proceeds and with reference to the accompanying drawings wherein:

FIGURE 1 is a side elevational view of a tie down winch constructed in accordance with the principles of the present invention;

FIGURE 2 is an end view of the winch shown in FIGURE 1, showing the winch in position in a retainer channel therefor;

FIGURE 3 is a top plan view of the winch shown in FIGURE 1; and

FIGURE 4 is an end view of the winch, showing the drum inclined about an axis extending longitudinally of the tie down in broken lines.

In the embodiment of the invention illustrated in the drawings, I have shown in FIGURES 1 and 2, a tie winch 10, adapted to be mounted in a retainer channel 11, which may be recessed within a flat deck of a railroad car (not shown), and extend longitudinally therealong for substantially the length thereof.

Retainer channels 11 may extend along opposite sides of the railroad car, and other inboard channels (not shown) may be spaced inwardly of the side of the railroad car a substantial distance, to facilitate the tying down of heavy vehicles, such as trucks, tractors and the like to the car, as shown and described in my prior application Ser. No. 400,202 filed Mar. 16, 1965, and entitled, "Tie Down System for Heavy Vehicles."

Each retainer channel 11 is provided with inwardly extending anchoring flanges 12, extending inwardly of the side walls thereof and having a series of aligned inwardly opening locking notches 13, formed therein. The notches 13 are engageable with interlocking lugs 15 extending upwardly of abutment flanges 16, extending outwardly of opposite sides of a base 17, and locked in abutting engagement with the undersurfaces of the retainer flanges 12 by spaced locking arms 18, 18. The locking arms 18, 18 are longitudinally pivoted on opposite sides of the longitudinal center line of the base 17 a substantial distance above the flanges 16, 16, on longitudinally extending pivot pins 19, 19 mounted in end walls 21, 21 of the base 17. The end walls 21, 21 extend upwardly of opposite end portions of said base and with the top surface of said base define a recess at their inner sides, to receive a winch block 23 longitudinally pivoted to said end walls.

The locking arms 18, 18 are mounted on the end walls 21, 21 on the pivot pins 19, 19 and have lower end portions extending along the insides of the flanges 12, when in the locking positions shown in FIGURE 3. The arms 18, 18 also have outwardly inclined abutment faces 24, 24 engageable at their inner ends with the top edge surfaces of the flanges 12, 12, to hold the winch in the elevated operative position shown in FIGURE 4.

As shown in FIGURES 2 and 4 each locking arm 18 has an inwardly recessed inner wall 25 engageable with opposite ends of a locking wing 26, pivotally mounted on the end wall 21, coaxial with the longitudinal center line of said end wall, on a pivot pin 27. A hand lever 29 extends radially outwardly of the pivot pin 27 generally perpendicular to the locking wing 26 and may be formed integrally therewith. A finger grip 30 extends outwardly of the outer end of the hand lever 29. The hand lever 29 will thus pivot said lock wing from the release position shown in FIGURE 2 to the locked position shown in FIGURE 4, in which said lock wing has cammed the lock levers 18 outwardly in position, to position the downwardly facing lower inside ends of the abutment faces 24 into engagement with the tops of the inner edges of the retainer flanges 12, 12, to lock the winch in its elevated operative position. Each locking arm 18 has a lug 31 projecting axially of its lower inner end and forming a stop for the hand lever 29, it being understood that said hand lever may be pivoted from a vertical released position in either direction, to effect camming of the locking arms 18, 18 to their laterally extended locking positions.

Protective ledges 32, 32 extend outwardly of the end walls 21, 21 over the pivot pins 19, 19 and locking arms 18, 18 and afford a means for protecting said locking arms and the hand lever 29.

The spaced end walls 21, 21 extending upwardly of opposite ends of the base 17, are relatively thick to provide the stock to form rugged coaxial pivotal supports for pivot pins 33, 33. The pivot pins 33, 33 extend longitudinally of the winch block 23 beyond each end thereof and are shown as being formed integrally with the end walls of the winch block intermediate the top and bottom sides thereof. As shown in FIGURES 1 and 3 upwardly opening cavities 35, 35, conforming generally to the forms of the pivot pins 33, 33 are provided in the end walls 21, 21 and open to the tops and inner ends of said end walls, to form pivotal mountings for the pivot pins 33, 33. The cavities 35, 35 opening to the tops of said end walls, thus accommodate the placing of the winch block 23 in the space between said end walls, with the pivot pins 33 in engagement with the cavities 35. The cavities 35 may then be closed by a closure plate 37 fitting over the top of an associated cavity and welded in position in the end wall 21 over the associated pivot pin 33. The closure plates 37, 37 thus permanently mount the winch block 23 on said end walls for pivotal movement with respect thereto.

The winch block 23 is shown as being an integral casting having laterally spaced side walls 39, between which is mounted a take-up drum 40 on a transverse shaft 41, rotatably mounted at its ends in the side walls 39, 39. The shaft 41 has a squared socket 43 therein to receive the squared end of a hand crank or ratchet arm, to turn the shaft and take-up drum 40 to take up on a flexible connector, such as a chain 45 secured to said take-up drum, as by a machine screw or nut and bolt (not shown) fitting through a hole 46 in the take-up drum. A link of the chain 45 fits in a socket 47 formed in the drum and a groove 48, for a link of the chain, leads from the socket 47 and extends partially about the drum, to accommodate uniform winding of the chain 45 on said drum.

Ratchet wheels 49, 49 are mounted on the shaft 41 on each side of the take-up drum 40 and may be welded or otherwise secured to said shaft. The ratchet wheels 49, 49 are releasably engaged by pawls 50, 50, extending along the insides of the side walls 39, 39 and mounted on a common transverse pivot pin 51, rotatably mounted in the side walls 39, 39 at its ends. Radial keys 53 are provided to key the pawls 50 to the shaft 51 and effect release and locking movement of said pawls together.

The winch block 23 and take-up drum 40 rotatably mounted therein are thus freely pivotally movable about an axis extending longitudinally of the base 17. The chain 45 may thus extend from the take-up drum in perpendicular relation with respect to the axis of rotation of said drum and the take-up drum and chain may freely conform to the angle required to attach the chain to a vehicle on a freight car and hold the vehicle to the car.

It may further be seen from FIGURE 1 that the chain 45 may be extended angularly forwardly of the drum 40 or rearwardly of the drum and at various angles with respect to the drum, making it possible to use the tie down winch for right and left hand tie down operations, and making it unnecessary to provide separate right and left hand tie downs for opposite sides of the car.

While I have herein shown and described one form in which the invention may be embodied, it may readily be understood that various variations and modifications in the invention may be attained without departing from the spirit and scope of the novel concepts thereof.

I claim as my invention:

1. An apparatus for anchoring heavy articles to a transporting vehicle having a flat deck, comprising:

an elongnated channel adapted to be recessed in and fixedly secured to the deck of the vehicle and having upstanding side walls and inwardly directed retainer flanges provided with aligned inwardly opening notches, a rigid base fitting between said side walls beneath said flanges for free longitudinal adjustable movement along said channel, said base having interlocking lug and flange means extending along opposite sides thereof, clear of said retainer flanges in the lower position of said base and engaging the under surfaces of said retainer flanges and the notches forrmed therein, in the raised position of said base, locking means positionable to engage said lug and flange means with said channel and lock said base in an elevated position, a winch block having aligned pivot pins extending from opposite ends thereof intermediate the top and bottom sides thereof, and pivotally mounting said winch block on said base for free pivotal movement with respect thereto about an axis extending longitudinally of said base and channel, a take-up drum pivotally mounted in said winch block for take-up movement about an axis extending transversely of the axis of pivotal movement of said winch block, means for holding said take-up drum from rotation in one direction, and a flexible connector attached to said take-up drum for tie-down connection to a vehicle and extensible in a forward or rearward direction from said drum and conforming said drum to the plane of said flexible connector when tying down a load.

2. The structure of claim 1 wherein pawl and ratchet means hold said take-up drum from rotation in one direction and wherein the pivot pins extended longitudinally forwardly and rearwardly of each end of said winch block and have coaxial axes intersecting the axis of rotation of said take-up drum.

3. The structure of claim 1 wherein the locking means at opposite ends of said base are outwardly swingable and manually positionable to engage the top surfaces of said retainer flange and to thereby support said base and winch block in an elevated tie-down position in said retainer channel.

4. An apparatus for anchoring heavy articles to a transporting vehicle having a flat deck, comprising:

an elongated channel adapted to be recessed in and fixedly secured to the deck of the vehicle and having upstanding side walls and inwardly directed retainer flanges provided with aligned inwardly opening notches, a rigid base fitting betwen said side walls beneath said flanges for free longitudinal adjustable movement along said channel, said base having interlock lug and flange means extending along the opposite lower outer margins thereof clear of said retainer flanges in the lower position of said base and engaging the under surfaces of said retainer flanges and the notches formed therein, in the raised position of said base, outwardly swingable lock means at opposite ends of said base, positionable to engage the top surfaces of said retainer flanges and to lock said anchoring member in an elevated position, a winch block longitudinally pivoted to said base for free pivotal movement with respect thereto about an axis extending longitudinally of said base, a take-up drum pivotally mounted in said winch block for take up movement about an axis extending transversely of the axis of pivotal movement of said winch block, pawl and ratchet means for holding said take-up drum from rotation in one direction, and a flexible connector attached to said drum for tie down connection to a vehicle and extensible in a forward or rearward direction from said drum and conforming said drum to the plane of said flexible connector when tying down a load.

5. An apparatus for anchoring heavy articles to a transporting vehicle having a flat deck, comprising:

an elongated channel adapted to be fixedly secured to the deck of the vehicle and having upstanding side walls and inwardly directed retainer flanges provided with aligned inwardly opening notches, a rigid base fitting between said flanges for free longitudinal adjustable movement therealong and having interlock lug nad flange means on the opposite lower outer margins thereof, clear of said retainer flanges in the lowered position of the base and engageable with said notches and the undersurfaces of said retainer flanges, in the raised position of the base, outwardly swingable lock means at opposite ends of said base, manually positionable to engage the top surfaces of said retainer flanges and support said base in a tie down position in said retainer channel, a winch block recessed within said base and pivoted at its opposite ends to said base for movement about an axis extending longitudinally of said base and channel, said winch block having parallel spaced side walls and end walls connecting said side walls together, a transverse shaft rotatably mounted at its ends in said side walls and having a take-up drum mounted thereon between said side walls, and ratchets on opposite sides of said drum inwardly of said side walls and having ratcheting connection with said drum, pawls pivotally mounted between said side walls for engagement with said ratchets for retaining said ratchets from rotation in an unwinding direction, and a tie down chain secured to said drum for tie down attachment to a vehicle and the like and pivoting said tie down drum and winch block about the axis of connection of said winch block to said base, to conform said tie down drum to the plane of said tie down chain as tension on said chain is taken up by said drum.

6. An apparatus for anchoring heavy articles to a transporting vehicle having a flat deck, an elongated channel adapted to be fixedly secured to the deck of the vehicle and recessed therein and having upstanding side walls and inwardly directed retainer flanges provided with aligned inwardly opening notches, a rigid base fitting between said flanges for free longitudinal adjustable movement therealong and having interlocked lug and flange means extending along the opposite lower outer margins thereof, clear of said side walls in the lowered position of said base and having locking engagement with said notches and retainer flanges in the upper position of said base, said base having spaced apart upright end walls extending above said flanges and having an upwardly opening recessed portion in the space between said end walls, outwardly swingable lock means at opposite ends of said base, positionable to engage the top surfaces of said retainer flanges and hold said lug and flange means in locked engagement with said retainer flanges and inwardly opening notches, a winch block in said upwardly opening recess having axially aligned pivot pins extending from opposite ends thereof and pivotally mounted in said end walls for free movement about an axis extending longitudinally of said base and channel, said winch block having parallel spaced side walls and end walls connecting said side walls together and having axially aligned pins extending forwardly and rearwardly of said end walls, pivotal bearing recesses in said end walls facing said upwardly opening recessed portion and forming pivotal mountings for said pivot pins, a transverse shaft rotatably mounted in said side walls and having an end portion adapted to receive a ratcheting lever and the like, said shaft also having at least one ratchet secured thereto, inwardly of said side walls, at least one pawl mounted on said winch block for pivotal movement into engagement with said ratchet wheel, a take-up drum mounted on said shaft and connected with said pawl to be rotated by said shaft, and a take-up chain secured to said take-up drum to be trained forwardly and rearwardly therefrom, and conforming said winch block and take-up drum to the plane of said tie down chain when attached to a vehicle and the like.

7. An anchoring apparatus in accordance with claim 6, wherein the outwardly swingable lock means pivotally mounted on the outer ends of said end walls comprise:

a pair of lock arms pivotally mounted on each end wall equal distances from the transverse center thereof and a substantial distance above said flange and lug means and having downwardly inclined outer abutment faces terminating in shoulders engageable with the top inner edges of said retainer flanges, a wing pivoted to each end wall between said locking arms and having opposite ends engaging the inner sides of said locking arms upon turning movement of said wing, for moving said locking arms into position to engage the top surfaces of said retainer flanges, and means rotatably moving said wing to effect movement of said locking arms into their locking positions and release of said locking arms.

References Cited
UNITED STATES PATENTS

| 2,738,204 | 3/1956 | Ibey | 280—179 |
| 3,140,850 | 7/1964 | Packard | 248—361 |
| 3,157,133 | 11/1964 | Wojcikowski | 105—368 |
| 3,158,108 | 11/1964 | Sharp | 105—369 |
| 3,263,629 | 8/1966 | Higuchi | 105—369 |

ARTHUR L. LA POINT, *Primary Examiner.*

DRAYTON E. HOFFMAN, *Examiner.*